Figure 6:
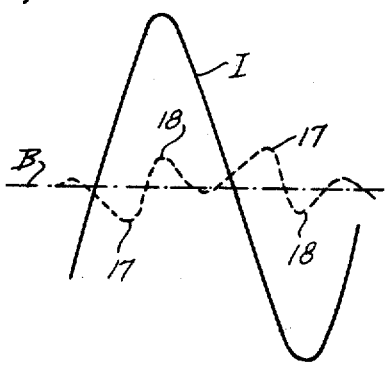

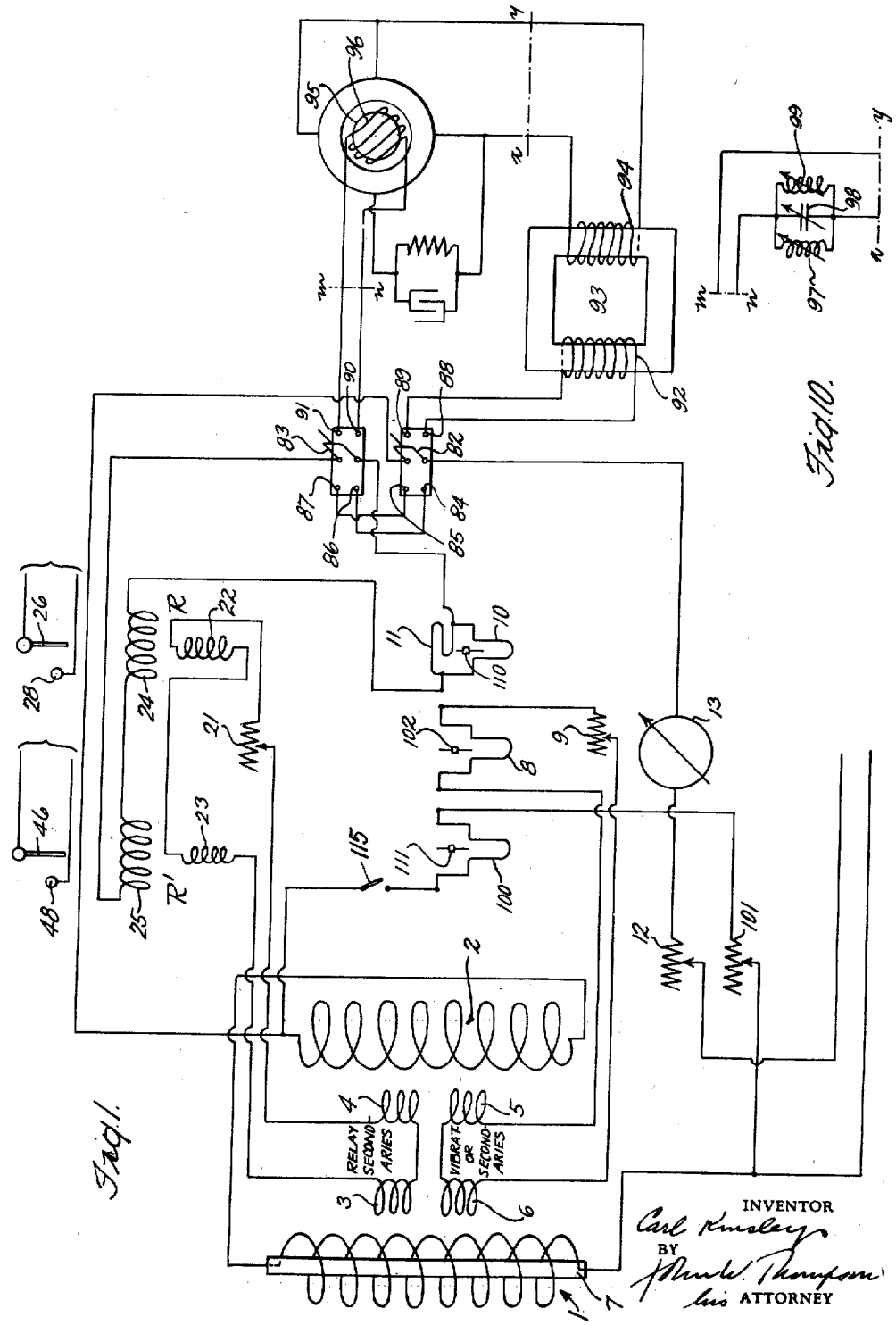

July 7, 1931.  C. KINSLEY  1,813,746
METHOD OF AND APPARATUS FOR MAGNETIC TESTING
Filed Feb. 23, 1927  4 Sheets-Sheet 2
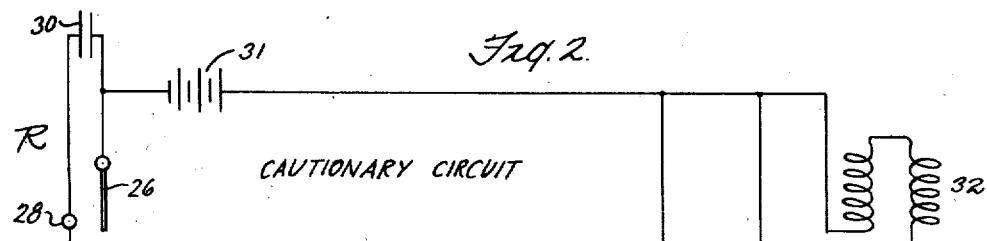
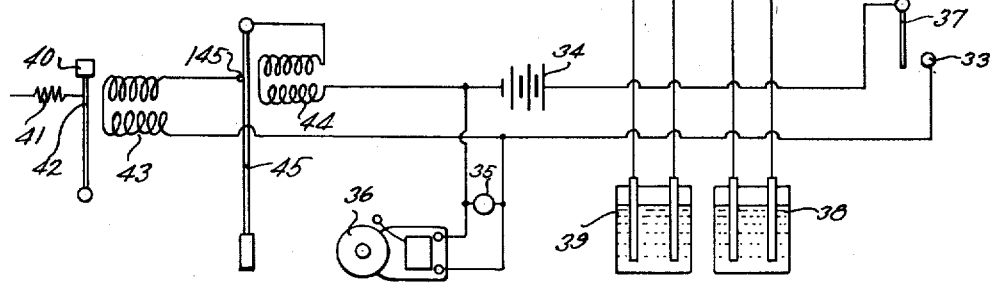
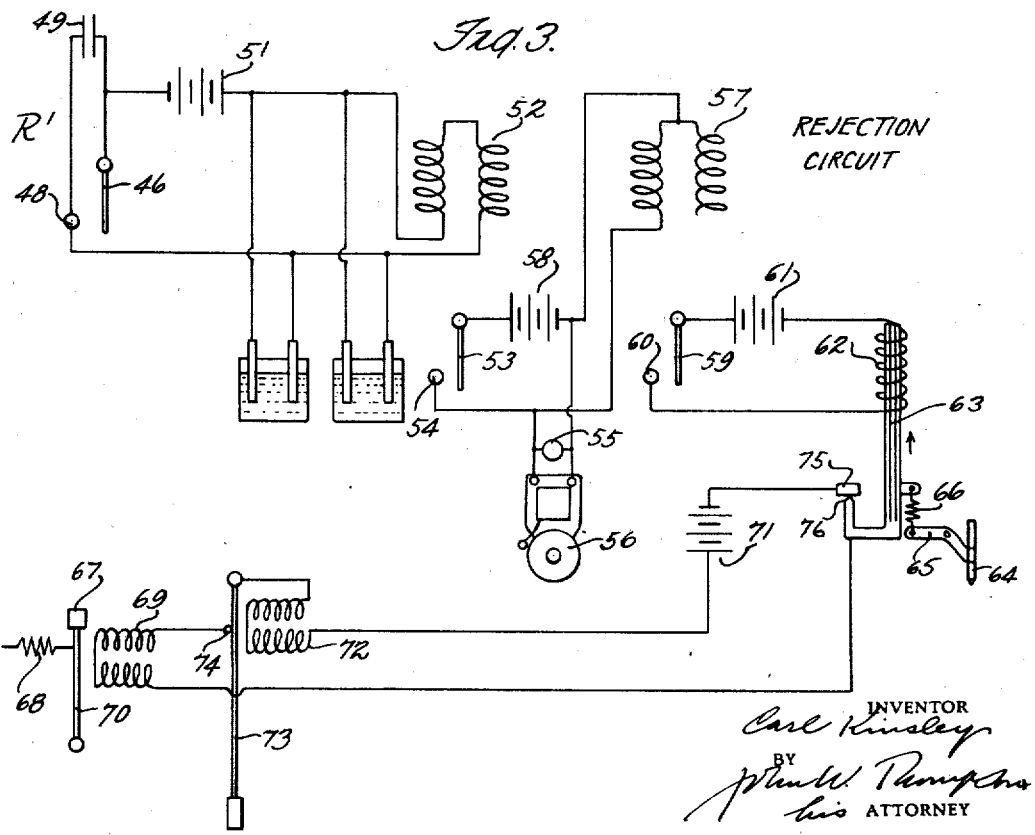

July 7, 1931. C. KINSLEY 1,813,746
METHOD OF AND APPARATUS FOR MAGNETIC TESTING
Filed Feb. 23, 1927 4 Sheets-Sheet 3

INVENTOR
Carl Kinsley
BY
John W. Thompson
his ATTORNEY

July 7, 1931.  C. KINSLEY  1,813,746
METHOD OF AND APPARATUS FOR MAGNETIC TESTING
Filed Feb. 23, 1927  4 Sheets-Sheet 4
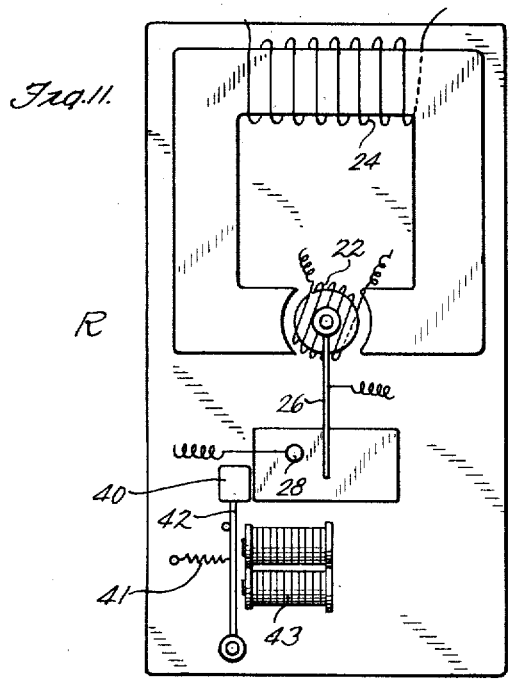
Fig.11.
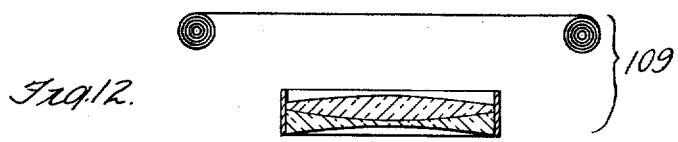
Fig.12.
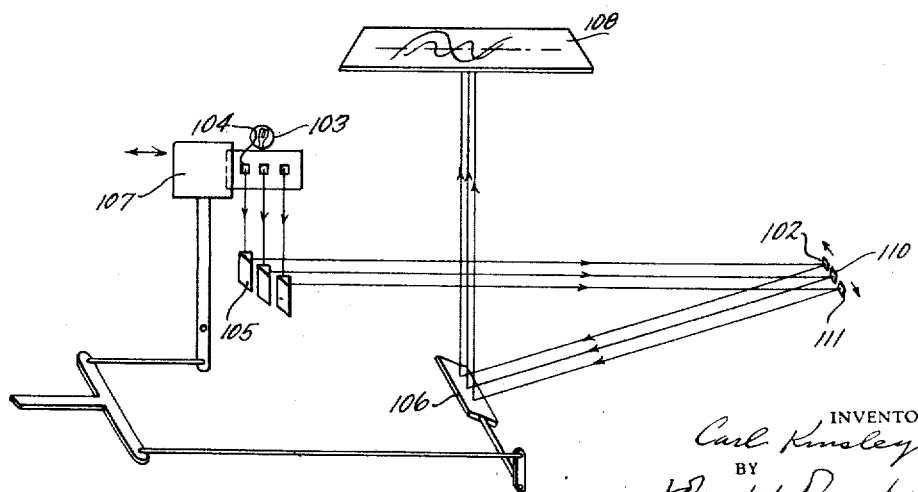
INVENTOR
Carl Kinsley
BY
John W. Thompson
his ATTORNEY Patented July 7, 1931

1,813,746

UNITED STATES PATENT OFFICE

CARL KINSLEY, OF SCARSDALE, NEW YORK, ASSIGNOR, BY MESNE ASSIGNMENTS, TO MAGNETIC ANALYSIS CORPORATION, OF LONG ISLAND CITY, NEW YORK, A CORPORATION OF NEW YORK

METHOD OF AND APPARATUS FOR MAGNETIC TESTING

Application filed February 23, 1927. Serial No. 170,195.

The present invention relates to an improvement in methods of and apparatus for testing articles or objects composed of magnetizable material. In various forms of testing apparatus heretofore devised, it has been possible to determine the presence of faults in the physical structure of the specimen under observation. It has also been possible to determine the presence of variations in physical structure from one part to another of a specimen and between a specimen and a standard. Other methods of testing have been directed toward a determination of the degree of hardness of a specimen as compared to a standard and have been based on well known observations concerning permeability and hysteresis in magnetizable bodies varying in the quality of hardness.

In all of the testing methods noted above and in others, it has been common practice to provide a visible or audible indication of the presence of faults or variations in structure. For example, in comparative tests for hardness, the extent of deflection of the pointer of a current or potential measuring device has been accepted as an indication of the relative hardness or softness of the specimen. In some cases the current or electromotive force manifested by the deflection of the needle has been utilized to cause the operation of a visible or audible signal whenever such current or electromotive force has attained a certain predetermined magnitude. It will be apparent that a magnetic testing system the results of which are expressed only by what may be termed a quantitatively actuated or controlled signalling device will have a relatively limited utility, largely because it involves the likelihood of error wherever magnetism affecting properties of opposite sense are simultaneously encountered by the exploring device. Thus, if a tested specimen appears to correspond to a standard in hardness, it is quite possible that the specimen will actually be much softer than the standard and at the same time have another variation, possibly a mechanical fault or a chemical variation operating to cancel the effect of the greater softness of the specimen which would otherwise be apparent.

One of the objects of the present invention has been to extend the scope of magnetic analysis so that more accurate and informative data may be obtained from the observed magnetic reactions not only to determine the presence of magnetism affecting properties or characteristics in a given magnetizable specimen but to determine readily, accurately and with certainty what those properties or characteristics are.

From extensive tests there is evidence to indicate that each one of a number of changes or variations in a specimen of magnetizable material, will under suitable conditions produce a unique or characteristic alteration in the response of the material to the application of magnetic force. Some of the characteristics or properties investigated in connection with this invention are alloy composition, carbon content, strains and stresses, impurities content and chemical and physical conditions of the metal. Variations in magnetic effect due to variations in properties or characteristics of the kinds stated are manifested in a comparison of the shapes of magnetization curves worked out for different combinations of said characteristics or properties. The perceptible differences in the magnetization curves so obtained may be relatively small even when the variation in the specimen is critical from a practical or commercial standpoint. Therefore it is preferable to base conclusions upon manifested variations between the magnetization curve of the specimen and that of a standard all of the pertinent constants of which are known and in such a way as to cancel most of the experimental errors normally present when a specimen is tested alone.

Tests show that the shape of the magnetization curve will assume a wide variety of forms depending upon variations in the different characteristics and properties of the tested material, and it has been observed that variations in certain qualities or properties of the tested material repeatedly cause an individually characteristic variation in the form of the magnetization curve. These observations have been sufficiently uniform to justify the hypothesis that variations in physical and other characteristics and properties of a magnetizable material, to which the same effective magnetic force is applied, will produce individually characteristic variations in the resulting magnetic fluxes. Exploring coils placed in these fluxes and connected to suitable measuring instruments will provide data as to current from which the characteristic and significant magnetization curves may be plotted. However, this procedure is too slow for commercial requirements although it might produce valuable results in research.

It has therefore been a further object of my invention to provide a method based on magnetic analysis whereby I effect representation of the instantaneous relationship between a specimen and a standard of known qualities, or a representation of a series of successive relationships where relative movement occurs between the specimen and the standard during testing. In any given comparative test the instantaneous relationship between the specimen and standard is reflected in the magnitude and other characteristics of the differential current induced in opposed secondaries having all constants equal except the magnetism affecting properties of the standard and the specimen. Where the magnetizing current is periodic each cycle thereof will produce a corresponding cycle of induced current in the exploring coils of the testing apparatus, and where the coils are arranged in opposed relation, the induced differential will have certain characteristics depending on variations of the specimen from the standard with respect to their magnetism affecting properties. Stated in a different way, my improved testing method is based on the concept that each chemical and physical property of a magnetizable body has a definite and characteristic influence upon the magnetic properties of that body; that this influence determines flux conditions when the body is subjected to a magnetic force; that flux conditions control the electromotive force and the resulting current in a circuit having a coil or equivalent element in the magnetic field affecting said body; and that variation or change in any given physical or chemical property of a magnetizable body produces a characteristic change in a secondary current produced as above stated. By producing representations of these current characteristics in connection with specimens of known chemical and physical properties, it is possible to establish standards with which to compare representations of current characteristics produced in connection with specimens of unknown properties and to draw reliable conclusions therefrom as to the structure and the chemical likeness or unlikeness thereof. Carrying the process further, where a standard and a specimen are simultaneously subjected to a magnetizing force and opposed coils are in the respective fields, it is possible to produce representations of the characteristics of the differential current in these coils and such representations will always be the same in character for differential currents produced by reason of variations between the standard and the specimen in respect to any given chemical or physical property. The representations will also preferably indicate the extent of variation of the specimen from the standard so that the observer will know both the character of the variation and whether or not it is of critical magnitude.

For most practical purposes, visible representations of the relationships above referred to will be satisfactory, although it will be apparent to those skilled in the art that representations of different character may be produced by suitable devices. Such representations or other sensible manifestation which will represent the current component relationships hereinabove described are intended to be included in the broader definition of my invention.

One form of apparatus which I have found to be effective in carrying forward the steps of my improved method, is described in the following specification and illustrated in the drawings therewith in which Figure 1 is a wiring diagram of the main, secondary, and phase shifter circuits of testing apparatus according to my invention, Figure 2, a wiring diagram of the cautionary signal circuit co-operating with one secondary circuit shown in Figure 1.

Figure 3, a wiring diagram of the rejection signal circuit also co-operating with said secondary circuit and the cautionary relay circuit shown in Figure 2.

Figure 4:
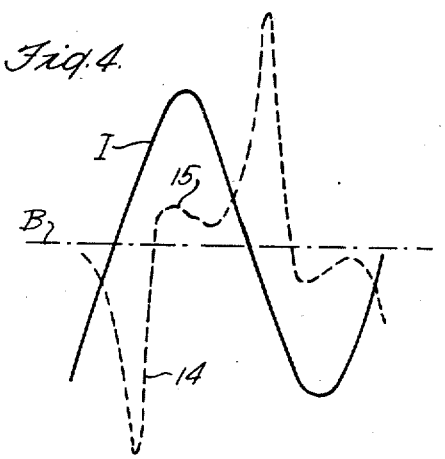

Figure 4, a representation of lines indicating wave form images which show the relative positions and magnitudes of current components of a periodic primary or magnetizing current and a differential secondary resulting from flux variations due to variation of the specimen from the standard in respect to decarbonization of the surface of the specimen.

Figure 7:
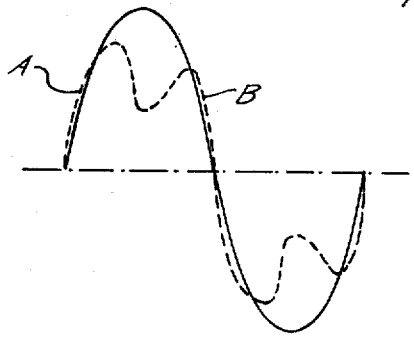
Figure 5:
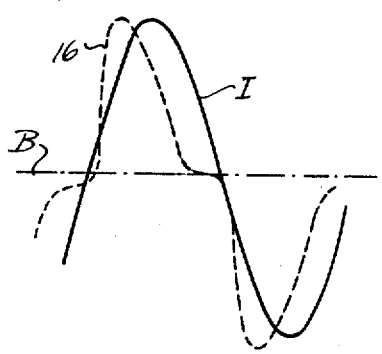
Figure 8:
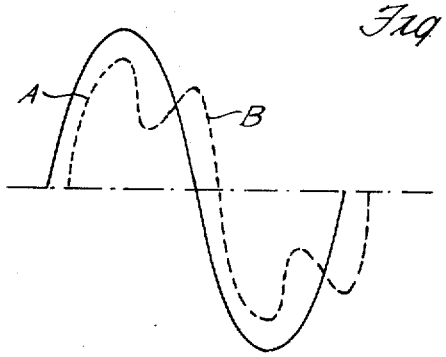

Figure 5, the same as Figure 4 except that the irregular line indicates a variation of the specimen from the standard in respect to structure of the metal, the specimen being coarser than the standard, and sufficiently coarse to render the specimen unsuited to a certain manufacturing use, Figure 6, the same as Figures 4 and 5 except that the irregular line indicates only a slight variation of the specimen from the standard in respect to structure of the metal and decarbonization, the specimen being slightly coarser than the standard, but fine enough and otherwise suitable for said certain manufacturing use, Figure 7, a diagram representing a normal phase relation between a magnetizing current and an induced differential, Figure 8, a diagram representing a phase relation between a signal relay primary energizing current and an induced differential current where phase adjustment of said current in the signal relay primary has been shifted in one direction.

Figure 9:
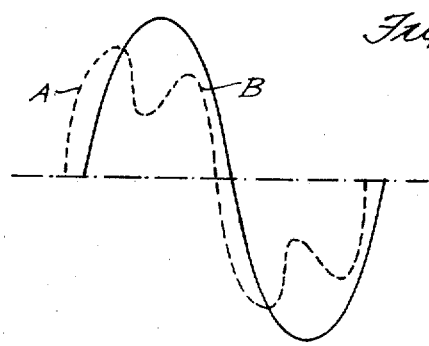

Figure 9, a diagram representing a phase relation between a signal relay primary energizing current and an induced differential current where phase adjustment of said current in the signal relay primary has been shifted in the opposite direction from that shown in Figure 8, Figure 10, a diagram representing a modified form of phase shifting means, Figure 11, a view partly diagrammatic illustrating the construction of the cautionary and rejection controlling relays indicated in Figure 1, and Figure 12, a diagram of an optical system for producing the wave form images referred to in connection with the description of Figures 4 to 6 inclusive.

The drawings represent a form of apparatus designed more particularly to test magnetizable materials such as iron or steel strips, bars, rods, cables or other elongated units, although it is not intended that these shall indicate a limitation of the method to the testing of such forms or exclude its application to the testing of magnetizable material in other forms and shapes. Referring to the drawings, a preferred embodiment of my improved apparatus includes a pair of primary testing coils 1 and 2 respectively arranged in series in a main magnetizing circuit. I have also provided two pairs of secondaries, one pair comprising the opposed coils 3 and 4 respectively, hereinafter referred to as the relay secondary arranged in a relay circuit and the other pair comprising the opposed coils 5 and 6 respectively, hereinafter referred to as the vibrator secondary, arranged in circuit with a galvanometer vibrator provided with special devices for producing a visible representation of the wave forms of currents induced in said secondaries. Both secondaries 3 and 6 are positioned in coil 1 at approximately the zone of greatest flux density while the secondaries 4 and 5 are similarly positioned with respect to the primary 2. From the foregoing it will be apparent that if primary coil 1 be energized and a magnetizable body such as a steel or iron bar 7 be inserted in said coil, certain effects will be produced in the corresponding secondaries. For example, if a bar or other piece of magnetizable material of exactly the same magnetism affecting properties as the bar 7 be introduced as a core into the coil 2, the magnetic results produced in the secondaries 4 and 5 will be similar in kind and magnitude to the results produced in coils 3 and 6 respectively so that, if the magnetizable articles are the same in respect to their magnetic properties, there will be no resultant measurable electrical effect in the secondaries. However, if in primary coil 1 a bar 7 of known properties is introduced and a bar of unknown and different properties is introduced in the primary 2, differential secondary currents will be induced in the circuits of secondaries 3 and 4 and 5 and 6 respectively. It is one of the purposes of the present invention to utilize the properties of these differential currents in such a way as to disclose the character and extent of the variation or difference between the standard in coil 1 and the specimen in coil 2.

The secondaries 3 and 4 together with the relays and other mechanism associated therewith are intended to provide and control signals, preferably audible or visible or both, from which it is possible for an observer or operator to draw conclusions with respect to the occurrence of a variation or variations in the specimen. The secondaries 5 and 6 together with a galvanometer vibrator and other devices associated therewith are intended to indicate in terms of suitable representations not only the occurrence of a variation but also the character and extent thereof. By calibrating the devices associated with the relay secondaries 3 and 4 referred to phenomena indicated by instruments associated with the vibrator secondaries 5 and 6, it is possible to produce signals in the relay circuit which will be indicative also of the character of the variation. In other words, by corelating the apparatus associated with the two respective secondaries, the selectivity or sensitiveness of the relay secondaries 3 and 4 may be so adjusted that visible and audible signals controlled and operated directly or indirectly by said secondaries will indicate the significance as well as the occurrence of current conditions in said secondary circuit. The vibrator secondaries and associated elements, therefore, serve both as a positive indicating means and as a means for calibrating the relay mechanism to operate selectively with respect to the occurrence and character of variations in the tested specimen.

The vibrator secondaries 5 and 6 are in circuit with a galvanometer vibrator 8 and a variable resistance 9 adapted to control or adjust the amplitude of the vibrator deflections or to increase or diminish the sensitivity of said galvanometer. This vibrator is provided with a mirror 102 forming part of an optical system, Figure 12, wherein a beam of light from a suitable source 103 passes through a shutter controlled aperture 104 and is reflected by a prism 105 to said mirror 102 and thence to a rocking or tilting reflector 106. The elements of the optical system just referred to form part of an instrument known as an oscillograph wherein the reflector 106 is pivotally mounted to rock periodically in synchronism with a shutter 107 controlling the aperture 104 and to transmit the reflected beam of light to a ground glass or other suitable screen 108 upon which images of said light beam paths are presented. When the screen is removed photographic apparatus 109 of any suitable or well known construction will record instantaneous or composite wave form images as desired.

If a specimen now be tested in coil 2 with standard 7 in coil 1, a differential current will be set up in secondaries 5 and 6, unless the specimen has the same magnetic properties as the standard, and the ground glass screen 108 will present a representation of a wave form which has been found to vary in contour in response to changes in current characteristics due to a difference between standard and specimen in one or more magnetism affecting properties. And if, under the conditions above stated, the test piece or specimen be moved through the test coil by hand or by any suitable instrumentality commonly known in the art, the ground glass screen 108 will present a succession of representations of instantaneous values of the secondary current in the shape of wave forms varying in contour in response to changes in flux and current characteristics due to differences in magnetism affecting properties between the standard and different portions of the specimens as they are successively presented in the effective field of coil 2. It has been found that the several properties of a specimen produce differential induced currents which present characteristic distinguishable wave form images on the ground glass 108 or other image receiving device above referred to. Therefore the wave form images thus produced indicate by the inter-relation of their component parts the particular properties in respect to which variation occurs and the relative importance of the variations.

Where a periodic magnetizing force is used in the testing coils of the apparatus above described, it is desirable to produce a representation of the wave contour of said force in juxtaposition to the image of the wave contour of the induced differential current. This is important because tests have indicated that variations in the specimen may be reflected not only in the shape and magnitude of the wave form images but also in their phase relation to the magnetizing force. For example, the screen may disclose a portion of a wave form image in connection with one specimen which will not differ widely from that of another specimen. However, if the distinctive features of the wave form image of one specimen occupy a different phase relation to the sine wave image of the magnetizing force from that of the wave form image of another specimen, it will indicate that the specimens vary from the standard in respect to different characteristics. This phenomenon is utilized in a practical way in connection with the operation and calibration of cautionary and rejection signal controlling relays hereinafter to be described. Suitable apparatus for presenting an image of the wave form of the magnetizable force comprises a galvanometer vibrator 10 with its shunt 11 in the main or magnetizing circuit which also includes a variable resistance 12 and an ammeter 13. The vibrator 10 is equipped with a mirror 110 which operates the same as that mounted on vibrator 8. In making tests and research observations in which the vibrators 8 and 10 are used, it has been found advantageous to provide a steady uniform periodic magnetizing current with a minimum of harmonics so that, when the vibrator 10 operates, the observed wave form image will approximate as nearly as possible a true sine wave curve as I in Figures 4 to 6 inclusive. This of course effects a corresponding simplification of the wave form image produced by vibrator 8 and representing the induced differential current, and to that extent, reduces the contours therein to those more distinctly associated with the several magnetism affecting properties of the specimen.

The wave form image producing means will also preferably include another vibrator 100 connected in parallel across the terminals of the primaries 1 and 2 and in series with a relatively high variable resistance 101. Said vibrator 100 is also provided with a mirror 111 forming part of an optical system similar to that associated with vibrator 8. When the circuit containing vibrator 100 is opened, as by a switch 115, the image reflected from mirror 111 appears on screen 108 as a straight line B, Figures 4 to 6 inclusive, which serves conveniently as a reference or zero current base line. When this circuit is closed by switch 115 the vibrator 100 will oscillate and a wave form image of the current flowing in said circuit which is proportional to the impressed electromotive force will be represented on the screen 108 simultaneously with the lines representing respectively the magnetizing current and the induced differential current. The sine wave image thus produced in proximity to the image of the induced differential current affords a convenient means of computing the amount of any required phase shift, hereinafter to be considered.

Figures 4 to 6 inclusive illustrate wave form images actually observed and recorded during testing operations. The magnetizing current operating on vibrator 10 produced an image in the form of a sine wave curve, I.

In Figure 4, loop 14 of the irregular curve produced by the differential secondary current operating in vibrator 8 indicates a variation of the specimen from the standard in respect to decarbonization and loop 15 a slight variation in respect to the structure of the metal. In Figure 5 loop 16 of the irregular curve characterizes the material as being unsuited for a contemplated purpose. The tested specimen broke at the portion in respect to which loop 16 was observed to occur and was of coarser structure than the standard. The irregular curve in Figure 6 includes loops 17 and 18 which indicate that in regard to decarbonization and structure of the metal, no variation is sufficiently important to render the specimen unsuitable for its intended use.

Thus far the description of one embodiment of apparatus for practicing my improved method has dealt with that portion thereof adapted to produce wave form images which by comparison will disclose changes in the differential current characteristics due to variation of a specimen from a standard in respect to one or more of its magnetism affecting properties or characteristics. These manifestations or images have a two-fold value. Primarily, they provide an intelligible and significant representation of an actual state of facts concerning the tested specimen. In the second place, they afford a fiducial record from which other apparatus may be calibrated to produce or control signals intended to mark the approach or occurrence of any predetermined current characteristic in the secondaries 3 and 4 due to variation of a specimen from a standard in respect to certain selected magnetism affecting properties. It will be apparent that in most industrial operations the purpose of a test is to determine whether or not a given specimen is suitable for its intended use. In general, therefore, the critical factors will be limited in number. For example, out of a possible ten properties of steel, the presence of only one may render the specimen unsuitable for its intended use. Or it may be that the presence of a certain property only beyond or within a predetermined degree or proportion will be fatal. It has heretofore been demonstrated that variations in respect to properties of widely different practical effect will produce similar quantitative manifestations in well known forms of testing apparatus and to this extent, previously known devices fail to meet certain commercial and scientific requirements. This difficulty is overcome in the use of my improved method and apparatus comprising effectively selective signal controlling devices operatively associated with the secondaries 3 and 4, which, as has been heretofore mentioned, are subjected to the same magnetizing force as that effective on the secondaries 5 and 6.

Referring again to Figure 1, and to Figure 11, I have provided two relays R and R' respectively, relay R controlling the operation of a cautionary or warning signal circuit, Figure 2, and relay R', a critical or rejection signal circuit, Figure 3. A variable resistance 21 is in series with moving coils 22 and 23 of relays R and R' respectively and electromagnetic fields are produced for said coils by means of relay primaries 24 and 25 respectively in the magnetizing circuit or other suitable circuit in which the phase shift is to be employed. The constants of these two relays may be adjusted so that they will operate in any desired sequence upon the occurrence of predetermined current values in the secondaries 3 and 4. Where the relay secondary and its associated signaling means are to be operated independently of the vibrator secondary and its associated image presenting means, the proper calibration of the former with the latter will be of prime importance as will be apparent on consideration of an actual problem. In a case where steel rods were to be twisted into coils, variation data in the shape of wave form images was secured and the tested rods were twisted. Breakages were checked against the variation data to define the critical variation limits. The signal controlling relays were then calibrated to operate only in response to the occurrence of differential current values corresponding to the current characteristics at which breakage was observed to occur. Where breakage occurred by reason of variations in different properties, a further calibration involving control of the phase relation between the magnetizing current and the relay primary energizing current was made so that the signal circuit became operatively selective. Furthermore, where variation occurred in respect to a characteristic as decarbonization, which disqualified the specimen for a reason other than liability to breakage, and of such magnitude as to cause signal operating current conditions in the relay secondary, the calibration further included phase adjustments whereby these particular current manifestations became ineffective to operate the signal relays or else became effective to operate a separate distinctive signal.

Referring now more particularly to Figures 2 and 11, the relay R is provided with a moving terminal or contact 26 which moves toward the fixed terminal 28 of a signal operating circuit in response to predetermined current values in the relay secondary hereinabove referred to. A spark absorbing condenser 30 is connected in parallel across said terminals 26 and 28 which are in circuit with a battery 31 or other suitable source of power and with a sub-relay 32 having an armature 37 co-operating with a terminal 33 to control a circuit including a battery or other source of power 34 and suitable signals arranged therein in parallel and consisting preferably of an electric light 35 and a bell or buzzer 36. In operation, the occurrence of a differential current in the relay secondary operates the relay R thereby deflecting the contact 26 against the terminal 28, thus closing the circuit whereby sub-relay 32 is operated causing the armature 37 thereof to move into engagement with terminal 33 to close the signal circuit. Obviously, a similar movement of contact 26 in the opposite direction could be made to operate a separate signal by providing a terminal and circuit for that purpose.

In addition to the foregoing, it has been found advisable particularly where relative movement occurs between the standard and a specimen to provide suitable means for promptly and effectively terminating operation of the signal controlling circuit as soon as the current in the relay secondary shall have receded from the point or degree at which it caused the initial operation or closing of said signal circuit. It will be understood that the relay R operates in response to a very small electromotive force in the circuit containing the relay secondary 22. It will also be understood that the difference between highly important variations in magnetic properties of specimens tested may be, and frequently is, manifested in relatively minute differences in electromotive force induced in said relay secondary. It is therefore important that the relay controlling circuit shall close whenever the induced differential current shall attain the predetermined value and freely open again as soon as that value diminishes. For this purpose, I have provided spark absorber elements 38 and 39 in parallel with the inductive winding of sub-relay 32 and which will absorb the stored energy when the relay contacts are opened. These spark absorbers are of substantially the same construction as an electrolytic rectifier and consist primarily of aluminum and iron electrodes in a saturated solution of ammonium phosphate. Thus, when there is a change in the current value in the relay secondary 22 after said secondary has operated to close an arm of the circuit through battery 31, the energy stored up in the coils of the sub-relay 32 will be absorbed so that no spark will occur between the terminal and the moving contact 26. This feature is important because the movement of contact 26 toward and away from terminal 28 under the influence of the differential current in the relay secondary 22 is positive and the extent and rapidity thereof in proportion to said current.

I have provided further, a mechanical device for insuring the prompt and effective separation of the moving contact or armature 26 from engagement with the terminal 28, said device consisting of a pivoted tapper 40 held normally in retracted position by means of a spring 41. A portion of said tapper includes an armature 42 co-operating with a coil 43 in circuit with the signal operating battery 31. In the same circuit, Figure 2, I have also provided another coil 44 co-operating with a pendulum armature 45 and a terminal 145 to form a circuit interrupter. Thus, when the pendulum armature swings in one direction to open the circuit, the tapper moves away from the coil 43 under the influence of spring 41, and when the pendulum swings in the opposite direction to close the circuit, the tapper is attracted toward coil 43 and strikes adjacent to the mounting of the moving contact or armature 26 of the relay R thus overcoming the effect of a possible very small cohesion operating to maintain the contact. The circuit hereinabove described may be conveniently identified as a cautionary signal controlling circuit although it need not necessarily be limited to such use. When used as a cautionary circuit, the main relay R will preferably be calibrated to control warning or cautionary signals sufficiently in advance of the expected occurrence of a critical or rejection signal so that the operator may be prepared to expect the rejection signal.

If the variation which has brought about operation of the cautionary signal increases in importance to a point where the electrical results indicate that the specimen should be rejected for its intended purpose, this point or condition will be announced by means of another signal circuit hereinabove referred to as the rejection controlling circuit which is operatively associated with the relay R'. As indicated in Figure 1, relay R' includes a primary 25 and a moving coil 23 to which is secured a terminal or moving contact 46 positioned to engage a fixed terminal 48. As heretofore noted, the constants of relay R' will be adjusted so as to operate in any desired sequence relatively to the operation of relay R and the signals associated therewith, the interval or difference in sensitiveness to applied electromotive force depending upon the character of the specimens tested. Referring to Figure 3, a spark absorbing condenser 49 is connected in parallel across the terminal 48 and the contact 46. Said terminal 48 and contact 46 are in circuit with a battery 51 or other source of power and with a sub-relay 52 having an armature 53 co-operating with a terminal 54 and suitable signals mounted therein in parallel and consisting preferably of an electric light 55 and a bell or buzzer 56. When the current magnitude in the moving coil 23 of relay R' exceeds that at which the cautionary signal was operated and reaches the point at which the rejection signal should operate, said moving coil 23 is energized sufficiently to deflect the contact 46 into engagement with the terminal 48, thus closing the circuit whereby the sub-relay 52 is operated. This moves the armature 53 of said sub-relay into engagement with terminal 54 to close the signal circuit associated therewith and produces both a light signal and an audible signal. In addition to said signals, it is also desirable to provide means for marking the specimen at the point or place in connection with which the fatal variation has been indicated so that the specimen may be rejected, retreated or otherwise disposed of in view of the variation noted. For this purpose a marking relay 57 is included in circuit with battery 58 which operates the signals 55 and 56. An armature or movable contact 59 engages a terminal 60 upon operation of the relay 57, thus closing a circuit which includes a battery 61 and a solenoid 62 in which a core 63 moves longitudinally, said core being provided with suitable marking means such as a pencil, brush or the like 64 mounted in a pivoted bracket 65, one end of which is secured to the core 63 by means of a spring 66. Thus, as the solenoid 62 is energized, the core 63 moves in the direction of the arrow thereby deflecting the marking device 64 into marking engagement with the specimens being tested.

It is also desirable to provide suitable mechanical means for insuring prompt and effective separation of the moving contact 46 from engagement with terminal 48, said device being similar to that hereinabove described in connection with the cautionary circuit. In the rejection circuit, such means include a pivoted tapper 67 held normally in retracted position by a spring 68 and positioned to operate effectively in the vicinity of the terminal 48. Said tapper is actuated by a coil 69 co-operating with an arm 70, said coil being in circuit with a battery 71 and with another coil 72 co-operating with a pendulum armature 73 positioned to swing toward and away from a terminal 74, thus periodically energizing the coil 69 as long as the contact 46 remains in engagement with the terminal 48. The circuit which includes battery 71 contains a terminal 75 and a switch 76 operated by movement of the marking device so that, when the rejection relay closes its circuit, the resulting operation of the marking device will close the tapper circuit. Relay R' is similar in every respect to relay R shown more in detail in Figure 11 except that the constants are adjusted to effect operation of the contact or moving terminal member in connection with the occurrence of current of greater magnitude than is required to operate relay R.

The signalling and marking apparatus hereinabove described will be effective in connection with the testing of a wide variety of magnetizable bodies. However, for reasons heretofore referred to it is important to introduce into the signal controlling circuits suitable means for rendering them more selective. This is particularly important where the controlling circuits are used independently of the vibrator circuits. One way of attaining this greater selectivity consists of introducing into the relay primary energizing circuit suitable means for shifting the phase thereof so that the effect of any differential secondary current operating in connection with said relays may be amplified or diminished. This operation is illustrated in the diagram shown in Figures 7 to 9 inclusive in which the line of irregular contour represents a wave form image of a cycle of a differential current induced in the secondaries 3 and 4, Figure 1. Loops A and B of said line represent variations of a specimen from a standard in respect to different characteristics or properties. In Figure 7 the line in the form of a sine wave curve is a wave form image of the magnetizing current operating in the primaries 1 and 2 and in the relays R and R'. In operation, the secondary of relay R for example, when energized by the current represented by said irregular line, will be subjected to a deflecting force proportional to the average value of the product of the instantaneous values of the primary and secondary currents affecting said relay. Therefore, where the primary current is constant the moving contact will be operated by means of a current which could be represented diagrammatically by the sine wave equivalent of the secondary or induced differential current of which the irregular line in Figures 7 to 9 is the wave form image. For reasons heretofore pointed out, a signal produced under these conditions may be entirely misleading. In some cases, it would fail entirely to indicate to an observer the character of the variation or combination of variations which brought it about. Therefore, it becomes desirable to provide means for diminishing or reinforcing the effect of one portion or another of the differential current by shifting the phase of the relay primary energizing current. This phase shift is illustrated in Figure 8 where the relay energizing current maximum is shifted to coincide with the loop A of the induced differential current. The relay will now operate in such a way as to indicate the occurrence of a variation associated with the particular current characteristics represented by the loop A. In Figure 9 the phase shift takes place in the opposite direction and in such a way as to cause the relay to operate upon the occurrence of a variation which induces a differential current in a representation of which loop B is significant or characteristic.

Referring now to Figure 1, I have illustrated a preferred form of phase shifting means which may readily be introduced into or cut out of the main magnetizing circuit of the testing device by means of switches 82 and 83 respectively. Thus, when these switches are closed into engagement with terminals 84, 85 and 86, 87 respectively, the main magnetizing current flows through the testing primaries 1 and 2 and the relay primaries 24 and 25. However, when switches 82 and 83 are closed through terminals 88, 89 and 90, 91 respectively, the main magnetizing current energizes a primary 92 of a transformer 93, thus producing an independent current in a secondary 94 of said transformer, said secondary having in its circuit a phase shifting device of any suitable construction and preferably one having a movable core 95 with a coil 96 in which a current is induced differing in phase from that of the original or main magnetizing current by any desired angle. The circuit including this coil is closed through the relay secondaries 24 and 25 by means of switch 83 engaging terminals 90 and 91. In a proper case, the relay primary energizing current may be maintained at any desired fixed phase angle with respect to the main magnetizing current by any suitable means, Figure 10, one form of which includes the variable inductance 97, the capacity 98 and the variable resistance 99, said elements to be inserted in the secondary circuit of transformer 93 in place of the adjustable phase shifter therein illustrated in Figure 1, at points in the circuits corresponding to the lines $m$, $n$ and $x$, $y$ therein.

The procedure and apparatus hereinabove outlined have been described in connection with a so-called comparison testing method or one in which a specimen is tested directly and simultaneously with a standard of known properties. It is contemplated that the same or slightly modified apparatus may be used to make the tests by a different or non-comparative method including steps as follows: subjecting a plurality of specimens to a magnetizing force in a primary, such as coil 1; producing wave form images of the currents induced in the secondary 5 by means of the vibrator and its co-operating optical devices; marking those portions of the specimens concerning which variation in characteristics of the induced current is noted by comparing the shapes of the wave form images produced; and applying destructive or manipulative forces to said marked specimens. Thus data will be secured from which suitable signal control adjustments may be made. The relay R is then calibrated to operate upon the occurrence of secondary current values predetermined according to the foregoing steps. When specimens are subjected to the magnetizing force in coil 1, the current induced in relay secondary 3 will cause operation of calibrated relay R whenever said current reaches the predetermined value. With the non-comparative method there will be no advantage in retaining coil 4 in opposed relation to coil 3 because a differential induced current is not desired. In addition to the adjustment of the relay constants, suitable phase shifting devices such as those hereinabove described, or others, will be advantageously employed to establish or maintain more effective selectivity in operation of the signal controlling relay.

I claim as my invention:

1. In apparatus for testing a magnetizable body, the combination of a pair of primary testing coils arranged in series, a pair of opposed vibrator secondaries, a pair of opposed relay secondaries, a relay primary arranged to be connected in the circuit of said primary testing coils, a moving relay coil in the field of said relay primary and in circuit with said relay secondaries, a vibrator in circuit with said vibrator secondaries, means co-operating with said vibrator for producing an image representing the wave form of current in said secondaries, and means for adjusting the relay to operate in accordance with current characteristics disclosed by the image producing means.

2. The method of testing a magnetizable body which includes simultaneously establishing a magnetic flux in a standard of known magnetism affecting properties and in said body respectively by means of a magnetic force and producing for inspection a representation of the instantaneous value variations of a cycle unit of the current produced by a difference in said magnetic fluxes due to a difference in a magnetism affecting property of said standard and said body.

3. The method of testing a magnetizable body which includes simultaneously establishing a magnetic flux in a standard of known magnetism affecting properties and in said body respectively by means of a magnetic force, and producing a continuous representation of instantaneous value variations in successive cycles of the differential current produced by a difference in said magnetic fluxes due to a difference in a magnetism affecting property of said standard and said body.

4. The method of testing a magnetizable body which includes simultaneously establishing a magnetic flux in a standard of known magnetism affecting properties and in said body respectively by means of a magnetic force, effecting relative movement between said standard and said body and producing for inspection a representation of successive instantaneous value variations of the current produced by a difference in said magnetic fluxes due to a difference in a magnetism affecting property of said standard and different portions of said body.

5. The method of testing a magnetizable body which includes simultaneously establishing a magnetic flux in a standard of known magnetism affecting properties and in said body respectively by means of a magnetic force and producing for inspection a representation of the amplitude variations of a cycle unit of the current produced by a difference in said magnetic fluxes due to a difference in a magnetism affecting property of said standard and said body and a representation of the amplitude variations of a corresponding cycle unit of the magnetic force and comparing the magnitude and phase relations of said current and said force as reflected in said representations.

6. The method of testing a magnetizable body which includes simultaneously establishing a magnetic flux in a standard of known magnetism affecting properties and in said body respectively by means of a magnetic force, and producing for simultaneous inspection a continuous representation of instantaneous value variations in successive cycles of the differential current produced by differences in said magnetic fluxes due to differences in magnetism affecting properties of said standard and said body and a continuous representation of instantaneous value variations in corresponding successive cycles of the magnetic force.

7. The method of calibrating a magnetic testing device having means to control the operation of a signal on the occurrence of selected variations of predetermined magnitudes in a specimen to be tested which includes producing images of wave forms characteristic of a selected varation in respect to portions of a plurality of magnetized specimens marking said portions, subjecting said specimens to manipulative forces, co-relating said images with the results of said forces at said marked portions, and adjusting said signal controlling means in the testing device to operate upon the occurrence of predetermined current values therein corresponding to current characteristics represented by said images.

8. The method of calibrating a magnetic testing device having means to control the operation of a signal on the occurrence of selected variations of predetermined magnitudes in a specimen to be tested which includes producing images of wave forms characteristic of a selected variation in respect to portions of a plurality of magnetized specimens, marking said portions, subjecting said specimens to manipulative forces, co-relating said images with breakages at said marked portions, and adjusting said signal controlling means in the testing device to operate upon the occurrence of current values therein corresponding to the current characteristics represented by said image produced in connection with the magnetizing of those portions of said specimens at which breakage occurred.

9. The method of testing a magetizable body which includes producing a wave form image of the current induced in the secondary of a transformer with said standard positioned in the effective field thereof, producing a wave form image of the current induced in the secondary of said transformer with said magnetizable body positioned in the effective field thereof, and comparing said wave form images.

10. In testing apparatus, the combination of a plurality of transformers having vibrator secondaries and relay secondaries, a relay in circuit with said relay secondaries, a vibrator in circuit with said vibrator secondaries, means cooperating with said vibrator for producing an image to represent the wave form of current in said secondaries, and means for adjusting the relay to operate in accordance with current conditions disclosed by the image producing means.

11. In testing apparatus, the combination of a plurality of transformers having vibrator secondaries and relay secondaries, a relay in circuit with said relay secondaries, a vibrator in circuit with said vibrator secondaries, means cooperating with said vibrator for producing an image to represent the wave form of current in said secondaries, a vibrator arranged in parallel with the primaries, and phase shifting means in the magnetizing circuit of the transformers.

12. The method of testing which includes subjecting a specimen to a magnetizing force in a transformer, producing a representation of the relationship between instantaneous values of current induced in the secondary circuit of the transformer while the specimen is in the effective magnetic field thereof, subjecting the specimen to inspection for determination of its physical and/or chemical properties, co-relating said representation with the results of said inspection, subjecting another specimen in a transformer to a magnetizing force having the same value and characteristics as those of the magnetizing force to which the first specimen was subjected, and comparing the representation of the relationship between instantaneous values of current induced in the secondary circuit of the transformer while the second specimen is in the effective field thereof with said first mentioned representations to determine the likeness or unlikeness of said specimens.

13. The method of calibrating an electromotive force operated signaling device to indicate the occurrence in a specimen of a variation of predetermined magnitude in respect to a selected property or characteristic of said specimen which includes producing a representation of the relationship between instantaneous flux values characteristic of a predetermined amount or extent of said selected property in a magnetized specimen, and adjusting the signaling device to be operated by an electromotive force resulting from flux conditions in a magnetized specimen which vary by reason of a difference between said standard and said specimen in respect to said selected property, from the flux conditions in respect to which said representations of instantaneous flux value relationship was made.

In testimony whereof, I have signed my name to this specification this 19th day of February, 1927.

CARL KINSLEY.

lected property in a magnetized specimen, and adjusting the signaling device to be operated by an electromotive force resulting from flux conditions in a magnetized specimen which vary by reason of a difference between said standard and said specimen in respect to said selected property, from the flux conditions in respect to which said representations of instantaneous flux value relationship was made.

In testimony whereof, I have signed my name to this specification this 19th day of February, 1927.

CARL KINSLEY.

DISCLAIMER 1,813,746.—*Carl Kinsley*, Scarsdale, N. Y. METHOD OF AND APPARATUS FOR MAGNETIC TESTING. Patent dated July 7, 1931. Disclaimer filed May 20, 1933, by the assignee, *Magnetic Analysis Corporation*.

Does not choose to claim by said Letters Patent, in and by claims 2, 3, 4, 9, and 12 thereof or any of them, and hereby disclaims from each of said claims, any method of testing excepting only the method in which representations of current wave forms are compared with regard to their peculiarities of form to determine differences in properties of a specimen with reference to those of a standard, and in which such peculiarities of form of current wave are due to the magnetizable properties of such specimens or standard and are not materially affected by other magnetizable material.

[*Official Gazette June 20, 1933.*]

DISCLAIMER 1,813,746.—*Carl Kinsley*, Scarsdale, N. Y. METHOD OF AND APPARATUS FOR MAGNETIC TESTING. Patent dated July 7, 1931. Disclaimer filed May 20, 1933, by the assignee, *Magnetic Analysis Corporation.*

Does not choose to claim by said Letters Patent, in and by claims 2, 3, 4, 9, and 12 thereof or any of them, and hereby disclaims from each of said claims, any method of testing excepting only the method in which representations of current wave forms are compared with regard to their peculiarities of form to determine differences in properties of a specimen with reference to those of a standard, and in which such peculiarities of form of current wave are due to the magnetizable properties of such specimens or standard and are not materially affected by other magnetizable material.

[*Official Gazette June 20, 1933.*]